United States Patent [19]
Baylor

[11] 3,880,478
[45] Apr. 29, 1975

[54] CRAWLER CHAIN SPROCKET WITH RELIEF OPENINGS

[75] Inventor: John M. Baylor, Bettendorf, Iowa

[73] Assignee: J. I. Case Company, Racine, Wis.

[22] Filed: Jan. 7, 1974

[21] Appl. No.: 431,582

[52] U.S. Cl. .......................... 305/13; 74/243 C
[51] Int. Cl. ................................. B62d 55/00
[58] Field of Search .......... 305/13; 74/243 R, 243 C

[56] References Cited
UNITED STATES PATENTS
1,549,594  8/1925  Menningen ................. 74/243 C
3,486,574  12/1969  Baron ............................. 305/13

*Primary Examiner*—Philip Goodman
*Attorney, Agent, or Firm*—Cullen, Settle, Sloman & Cantor

[57] ABSTRACT

A crawler chain sprocket includes a central hub connected to an outer rim on which a plurality of teeth are formed that engage and drive a crawler track. Concave sides on the teeth form root face portions between adjacent teeth. Relieved cutouts are formed on the sides of the root face portions in an alternating pattern so that dirt and debris can be expelled from the crawler track without establishing a concentrated, centralized wear pattern on the crawler track bushings.

11 Claims, 4 Drawing Figures

PATENTED APR 29 1975  3,880,478

CRAWLER CHAIN SPROCKET WITH RELIEF OPENINGS

BACKGROUND OF THE INVENTION

Crawler tractors are driven by a pair of endless chain tracks, each of which is mounted around a sprocket drive wheel and an idler roller. Such tractors have long encountered the problem of becoming clogged with mud, debris, snow and ice. Clogging presents grave problems because of chain breakage which can occur as a result. It can be appreciated that any such breakage requires a great deal of down time and mechanical labor due to the inherent size and nature of crawler tractors.

Various attempts have been made in the prior art to overcome the previously mentioned clogging problem. These attempts, for the most part, have been successful in eliminating the clogging problem, but in so doing have created other mechanical problems, particularly wear at the track bushings.

U.S. Pat. No. 1,479,349 to Wickersham, for example, illustrates that the sprocket teeth may be formed with beveled edges and that the sprocket root portions may be formed with scallops. It has been found that the beveled edges on the teeth adequately expel dirt and debris from between the track bushings but that the scalloped portions on the sprocket wheel do not sufficiently flush accumulated dirt and debris from between the teeth. To overcome this problem U.S. Pat. No. 607,940 to Best discloses that the root face portions should be formed with larger relief or vent openings. These large relief of vent openings, however, diminish the contacting surface of the sprocket root portion so that it contacts the track bushings substantially only at one point or over a small area. Use of such a sprocket design had proven that the track bushings experience an undue wear at the point or area of contact with the sprocket root face. This has caused considerable customer resistance to the use of such relief sprockets because of the diminution in track and track bushing life. Therefore, many manufactures have turned to the full width sprocket root face design illustrated in U.S. Pat. No. 2,238,347 to Starr.

The prior art also discloses the use of alternating recesses extending away from sprocket driving lugs as shown in U.S. Pat. Nos. 1,549,594, and 1,668,778 to Menningen and U.S. Pat. No. 1,922,357 to Diveny. The sprocket design disclosed by these patents, however, does not approach that of the present invention. For example, the particular sprocket designs disclosed by those patents are for use with a particular type of chain track. Specifically, none of those patents disclose sprocket teeth having concave sides to form root face portions with alternating relieved cutout regions.

The crawler sprocket design of the present invention overcomes these prior art problems by providing a simple, yet novel relief arrangement on the sprocket root face portions so that dirt and debris will be properly expelled from the chain track without creating a centralized wear pattern on the track bushings.

SUMMARY OF THE INVENTION

The present invention relates generally to driving sprockets for crawler tractors. More specifically, this invention relates to a crawler sprocket having a structural arrangement to expel dirt and debris from the tractor track.

The present invention includes a sprocket drive wheel for a crawler tractor having a central hub connected to an outer rim by a plurality of radially extending support webs. A plurality of radially extending teeth project outwardly from the rim to engage and drive the bushings of a crawler chain track. The teeth have concave, radially inwardly sloping sides which define a root face in the form of a valley between each two adjacent teeth.

It has been found in the operation of crawler tractors that dirt and debris tend to accumulate between the sprocket teeth. Any such accumulation increases the effective pitch diameter and circumference of the sprocket to thereby put a great stress on the track chain as it rotates in its path around the sprocket and idler roller. The stress resulting from the accumulation can become so great that the track bushings can snap or jump over the teeth during operation, causing damage to the bushings and sprocket teeth as well as the transmission and other undercarriage parts. When this happens the crawler goes momentarily out of control, since it is under the power of only one remaining chain track, until the operator can shut the controls off. It can be appreciated that until the crawler is brought under contol it presents a great hazard not only for the operator, but especially for anyone who may be working nearby.

The present invention contemplates expelling dirt and debris which would otherwise accumulate between the teeth by the provision of a relief cutout on the rim in the area of the root face. These cutouts allow the track bushings to actually extrude dirt and debris from between the sprocket teeth as they engage the sprocket.

To overcome the disadvantage of creating an undesirable wear pattern on the bushings due to the cutout areas, the present invention further contemplates staggering the cutouts from side to side on adjacent root face portions. Such an arrangement allows the track bushings to alternately engage cutouts on different sides of the root faces upon repeated engagement with the sprocket.

The size and configuration of the preferred form of the cutouts will depend upon the particular application and a compromise between wear, which will be created on the track bushings, and the efficiency of the configuration in expelling dirt and debris from between the teeth. Another consideration which may be taken into account in designing the preferred cutout would be the conditions under which the sprocket would be used. For example, the terrain, soil conditions and weather may be factors. In certain applications where strength and wear are not as critical, other configurations, such as square and rectangular, may be used. Further, the size of the cutouts, i.e., the extent of the cutout across any desirable fraction of the root face width, will again be dependent upon a compromise between wear on the bushings and expulsion of dirt and debris.

DETAILED DESCRIPTION OF THE INVENTION

Figure 1:
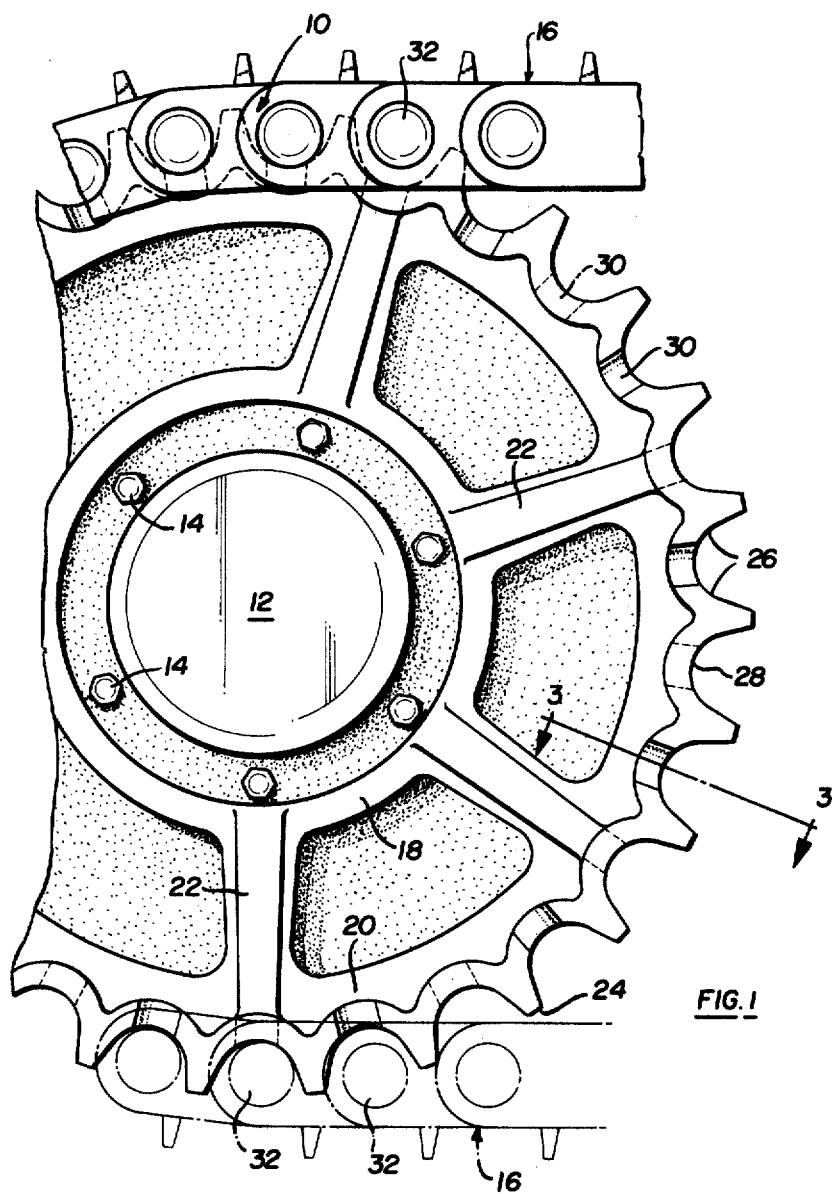
FIG. 1 is a side elevational view of the crawler sprocket forming the present invention.

The present invention relates to a sprocket 10 driveably mounted on the driving axle 12 of a crawler tractor by any conventional means, such as bolts 14. Although a crawler tractor is not illustrated, it is to be understood that the sprocket of the present invention can be used in any conventional crawler tractor. For example, such a crawler tractor might have a pair of endless chain tracks, such as that shown in FIG. 1 by reference numeral 16, encircling a driving sprocket, an idler wheel and supporting rollers. A more detailed description of such crawler tractors and chain tracks is included within the disclosures of U.S. Pat. Nos. 1,479,349 and 2,238,347, which are incorporated within the present disclosure by reference. U.S. Pat. No. 1,607,940 to Best, also incorporated herein by reference, illustrates a typical crawler chain track in detail. The sprocket forming the present invention may be utilized in combination with any of the prior art devices specifically discussed above and incorporated within the present disclosure.

Sprocket 10 can be made of any material, but preferably of a material exhibiting a good heat treat response such as cast or forged steel. The sprocket includes a hub 18 connected to a circular outer rim 20 by a plurality of webs 22. The outer region of the rim includes a plurality of teeth 24 having concave, radially sloping sides 26 defining a root face region 28 between each two adjacent teeth.

In accordance with the present invention, a relief cutout 30 is provided on one side of each root face region, generally centered between two adjacent teeth, to expel dirt which would otherwise accumulate on the sprocket and increase the load on the chain track. These relief cutouts, in effect, allow track 16 to extrude dirt and debris through the cutouts as the chain track comes in contact with the sprocket.

As previously discussed, relief areas on sprockets are generally known with the art. These known devices, however, either do not provide a large enough relief region to allow adequate expulsion of dirt and debris, or the reduced contact area on the sprocket creates an undersirable concentrated wear pattern on the bushings. The present invention overcomes the problem by providing relatively large cutouts on the root face in an alternating or staggered pattern around the sprocket. This can best be seen in FIG. 2. Such an arrangement allows the track bushings to alternately contact a root face with a cutout on an opposite side in its repeated contact with the sprocket as the chain is driven in a continuous path around the drive sprocket, idler wheeler and support rollers.

Figure 2:
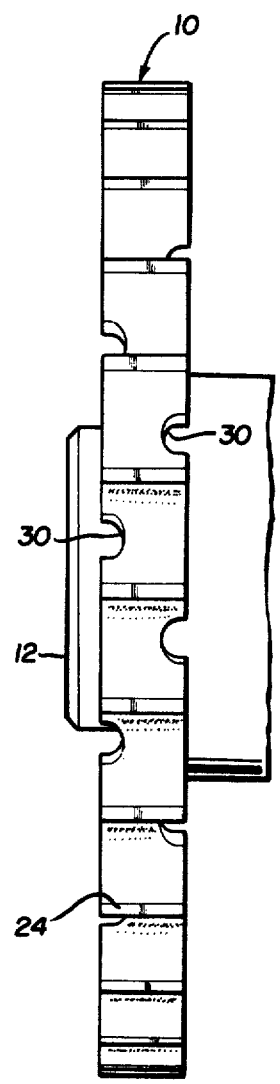
FIG. 2 is an elevational view parallel to the rotational axis of the chain sprocket and 90° removed from FIG. 1.

As can be seen in FIG. 2, cutouts 39 have a semicircular configuration. It will be understood that this illustration is merely exemplary and not limiting. For example, the cutouts could have any other desirable concave configuration, such as rectangular, square, or semi-elliptical. The semi-circular configuration is preferred because of the excellent structural integrity it affords. It can also be seen from FIGS. 2 and 3 that the cutouts extend totally through the thickness of the rim so that an unobstructive relief region is provided to facilitate better and more complete expulsion of dirt and debris.

Figure 3:
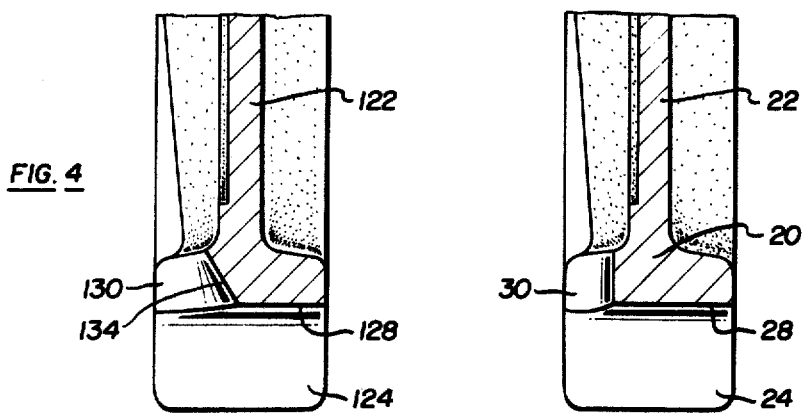
FIG. 3 is a sectional view along line 3—3 of FIG. 1, illustrating in detail the cross sectional configuration of one of the relief cutouts of the present invention.

FIGS. 2 and 3 further illustrate the cutout as extending across less than half the width of the root face. It is to be understood that this illustration is also exemplary and that the cutouts could have any width relative to the width of the root face, dependent on the application of the crawler. Quite naturally, a wider cutout provides better debris expelling action. However, wider cutouts also diminish the contacting area of the root face and tend to produce an undesirable wear pattern on the track bushings. It can therefore be appreciate that the precise width of the cutout is determined as a matter of preference on the basis of compromising between the two previously mentioned factors, i.e., better debris expulsion versus greater bushing wear. A preferred range for the width of the cutout relative to the width of the root face is about 40 to 50 per cent for the most common usages of crawler tractors. This range may vary to as low as about 25 per cent and as high as about 60 per cent under varying conditions. For example, in the unusual situation of a crawler being used in combination with a bulldozer implement to move unrefined sugar within a storage silo, or other such storage compartment, it has been found that a large relief opening is needed in order to adequately expel the tacky resins tending to accumulate on the sprocket wheel. For most other applications, it is preferable to limit the width of the cutout to about 50 percent of the width of the root face for a variety of factors other than the two previously discussed. Such factors include, first, the structural strength and rigidity of the sprocket rim. Second, with a cutout greater than fifty per cent, the wear on the bushings is concentrated on their ends due to the less than 50 per cent contacting surface remaining on the root face. As a result, a region in the center of the bushing is never contacted by the sprocket and a central "island" is formed.

FIGS. 1 and 2 illustrate that each cutout is generally centered between the two corresponding teeth between which it is formed. The circumferential dimension of the cutout is also determined according to the particular application of the crawler and sprocket, taking into consideration the structural integrity and rigidity of the sprocket rim. The preferred circumferential dimension of the cutout relative to the dimension of the chord, defined as the distance from one tooth peak to the other corresponding tooth peak, is in the range of from about 35 to 50 percent. However, this dimension can vary from between about 20 to 60 per cent of the chord dimension. As can be seen in FIG. 1, the track bushing rides in the back, or farthest counterclockwise, portion of the root face region. If the circumferential dimension of the cutout is made too large, greater wear is effected on the smaller contacting surface of the bushing. Further, with greater circumferential relief dimension, the cutout extends further into the radial side wall of the teeth to thereby diminish the structural rigidity of the sprocket rim. On the other hand, too small of a circumferential cutout dimension frustrates the overall object of the invention, which is to adequately expel dirt and debris from between the sprocket teeth.

Figure 4:
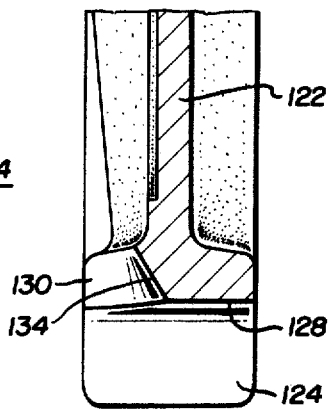
FIG. 4 is a fragmented sectional view similar to that of FIG. 3, but illustrating a different embodiment of the cross sectional cutout configuration.

FIG. 4 illustrates a different embodiment of the cutout, wherein the cutout extends across approximately half the width of the root face. The elements in this embodiment are numbered in the same sequence as the corresponding elements of FIGS. 1–3, but with the reference numerals being increased by a factor of 100. It can be seen that the particular cutout illustrated corresponds in position circumferentially to that of one of the radially extending support webs 122. If the cutout were to extend truly radially through the rim, the support provided by the web would be greatly diminished. To overcome this potential problem, the cutout is diminished in width in the radial direction to define a slanting cutout face 134. It is to be understood that when cutouts are provided with a width approximately half or even greater than half, the width of the root face, all the cutouts need not be provided with a slanting face as shown at 134, unless it is found desirable to do so in order to provide greater strength to the rim. Normally, only those cutouts in the region of the webs would be constructed as shown in FIG. 4.

In operation, chain track 16 is rotated around sprocket 10 and an idler wheel and support rollers (not shown) to drive the crawler tractor. The rotational movement of the chain track is accomplished by sprocket 10 engaging and driving track bushings 32. During such operation, dirt and other debris in the form of snow, ice, mud, and the like, tends to be picked up by the crawler track and accumulate on the sprocket and other parts of the crawler tractor. In the present invention, relief cutouts 30 are provided in the root face area 28 of the sprocket wheel to expel such debris which would otherwise accumulate between the teeth. From the lower part of FIG. 1, it can be seen that the rollers of the track bushing 32 contact the sprocket primarily in the region of root faces 28. With the cutout being provided in this same region of the sprocket, the area of contact between the root face and track bushing is diminished to put greater stresses and strains on the area of contact on the track bushings. The alternating or staggered pattern of relief cutouts on the sprocket rim enables the bushings to contact root faces with cutouts on different sides upon their repeated driving rotation around the sprockets and prevents lateral shifting of the track.

Although a preferred embodiment of the invention has been previously described in order to provide an example which can be followed by those skilled in the art of practicing the invention, it is to be understood that various innovations and changes can be made in the described structure without departure from the basic principles which underlie this invention. For example, a driving sprocket may be provided with an odd number of teeth and root face portions. With such a modification, it can be appreciated that a truly alternating or staggered pattern of cutouts cannot be accomplished. Rather, within the staggered pattern two adjacent cutouts must be on the same side of the rim due simply to the structural design of the odd number of root faces. As a separate modification, it may be desirable to provide a staggered pattern wherein a group of two or more adjacent cutouts is provided on one side of the rim while the next adjacent group of two or more cutouts is on the other side of the rim.

Having fully described my invention, I claim:

1. A combination crawler track chain assembly and crawler sprocket for a crawler tractor; said sprocket driveably mounted on a driving axle of a crawler tractor, said chain track including a plurality of generally parallel bushings having cylindrical surfaces which engage said sprocket for driving said track and said crawler, said sprocket comprising in combination:

a central hub connected to a coaxial circular rim, said rim including a plurality of radially directed, equally spaced peripheral teeth extending substantially across the entire rim width to engage and drive said bushings, said teeth having concave, radially sloping sides extending substantially across the entire width of the rim and defining an arcuatee root face valley between each two adjacent teeth, said root faces having a width generally the same as but slightly less than the width of said track bushings, said cylindrical bushing surfaces snugly fitting into said root face valleys to be driven by said sprocket, a relieved notch in only one side of and extending across less than half the width of each said root face to allow said bushings to expel dirt and debris from said sprocket root face region, the other side of said root face extending substantially to the opposed extremity of said rim, and said plurality of notches arranged in said root faces on alternate sides thereof, so that the wear pattern created on the crawler track bushings by repeated engagement with said root faces extends substantially across the width of said bushings.

2. The combination defined in claim 1, characterized in that each notch has a width in the range of between about 25–60% of the root face width.

3. The combination defined in claim 2, characterized in that the greatest circumferential dimension of each notch is in the range of between about 20–60% of the distance between the peak of each two adjacent teeth.

4. The combination defined in claim 2, wherein the greatest circumferential dimension of each notch is in the range of between about 40–50% of the distance between the peak of each two adjacent teeth.

5. The combination defined in claim 3, characterized in that the width of each notch is in the range of between about 40–50% of the root face width.

6. The combination defined in claim 4, characterized in that the width of each notch is in the range of between about 40–50% of the root face width.

7. The combination defined in claim 1, characterized by said relieved notches having a generally semicircular configuration across approximately half the width of each said root face portion.

8. The combination defined in claim 7, characterized in that each notch defines a generally radial cutout face along the thickness of the rim, and wherein the region farthest from the edge of said rim in at least some of the cutout faces defines an acute angle with the root face in a plane perpendicular to the axis of said sprocket, whereby the thickness of the rim increases in width in the radial direction to provide:

1. a relatively large cutout opening at the root face to allow greater expulsion of dirt and debris, and
2. greater structural rigidity to the sprocket.

9. The combination defined in claim 1, characterized by said circular rim having an odd number of teeth and root face portions, and within said alternating pattern of relieved notch portions two adjacent notches formed on the same side of the corresponding two adjacent root face portions due to the odd number of said root face portions.

10. A crawler chain sprocket for attachment to an axle of a crawler tractor, said sprocket when attached to said axle being partially lapped by a chain track having a plurality of generally parallel cylindrical bushings, comprising:
 a central hub connected to a coaxial circular rim,
 said rim having a plurality of radially directed, equally spaced teeth extending substantially across the entire rim width to engage and drive the bushings of a crawler chain track,
 said teeth having concave, radially sloping sides defining a root face valley between each two adjacent teeth,
 said root faces (a) having a width generally the same as but slightly less than the width of the track bushings, (b) extending substantially across the entire rim width, and (c) nestingly receiving said cylindrical bushings, wherein the improvement comprises:
 a generally semi-circular relieved cutout in only one side of and extending across less than half the width of each said root face to accomodate the radial expulsion of dirt and debris from the valley between the sprocket and track bushing, said generally semi-circular cutout configuration opening onto one of the outer edges of said root faces, the other side of said root face extending substantially to the opposed extremity of said rim, and
 said plurality of cutouts arranged on said root faces in an alternating, side-to-side pattern such that adjacent cutouts are on opposed sides of the corresponding adjacent root faces, so that the wear pattern created on the crawler track bushings by repeated engagement with said root faces extends substantially across the width of said bushings.

11. A crawler chain sprocket for attachment to the driving axle of a crawler tractor, said sprocket being particularly suitable for driving a chain track having a plurality of generally parallel cylindrical bushings, comprising:
 an inner hub connected to an outer circular rim, said outer rim including a plurality of equally spaced, radially outwardly directed teeth extending substantially across the entire rim width to engage and drive the cylindrical bushings of a crawler chain track, said teeth having concave, radially sloping sides defining a plurality of root face portions in the form of valleys between the teeth, said root face valleys extending across substantially the entire width of said rim for snugly receiving substantially the entire length of the cylindrical sprocket bushings, one such root face portion formed between each two adjacent teeth, said root face portions having widths substantially equal to but less than the width of the chain track bushings which are to be engaged and driven, wherein the improvement comprises:
 a relieved cutout region in only one side of each root face portion width to accommodate the radial expulsion of dirt and debris as the crawler chain track contacts the sprocket, the other side of said root face extending substantially to the opposed extremity of said rim,
 said relieved cutout regions being alternately located in opposed sides of adjacent root face portions so that the wear pattern created on the crawler track bushings by repeated engagement with said root face portions extends substantially across the width of said bushings.

* * * * *